United States Patent [19]
Inoue et al.

[11] Patent Number: 6,062,386
[45] Date of Patent: May 16, 2000

[54] BUNDLED WELDING WIRE COIL AND METHOD OF BUNDLING

[75] Inventors: Satoshi Inoue, Kokubunji; Ichiro Masuda, Chiba; Toru Ono, Hiratuka; Yukio Fujiwara, Narashino, all of Japan

[73] Assignee: Nippon Steel Welding Products & Engineering Co., Ltd., Tokyo, Japan

[21] Appl. No.: 09/218,099

[22] Filed: Dec. 22, 1998

[51] Int. Cl.$^7$ ............................................. B65D 85/66
[52] U.S. Cl. ..................... 206/397; 206/408; 206/586; 242/176
[58] Field of Search .................. 206/389, 395, 206/397, 408, 400, 586, 591; 242/170, 171, 172, 173, 176

[56] References Cited

U.S. PATENT DOCUMENTS

| | | | |
|---|---|---|---|
| 1,807,770 | 6/1931 | Beaman | 206/586 |
| 1,817,286 | 8/1931 | Beaman | 206/586 |
| 1,933,661 | 11/1933 | Dale | 206/397 |
| 3,149,719 | 9/1964 | Thompson et al. | 206/395 |
| 3,405,797 | 10/1968 | Dwyer, Jr. | 206/395 |
| 3,417,867 | 12/1968 | Kahn | 206/408 |
| 3,587,840 | 6/1971 | Hultberg | 206/395 |
| 4,671,409 | 6/1987 | Espy | 206/397 |
| 4,724,960 | 2/1988 | Goodrum et al. | 206/397 |
| 5,238,113 | 8/1993 | Parrott et al. | 206/395 |
| 5,287,968 | 2/1994 | Ridgeway | 206/586 |

*Primary Examiner*—Paul T. Sewell
*Assistant Examiner*—Nhan T. Lam
*Attorney, Agent, or Firm*—Sughrue, Mion, Zinn, Macpeak & Seas, PLLC

[57] ABSTRACT

A multi-tier winding coil 1 of a welding wire in a hollow cylindrical configuration having a beginning wire end which is located in the innermost tier and at one of cylinder end faces, a combination of such coil with a shipment packaging box 21, and a combination of the coil 1 and a wire feed adapter 5 which is used to mount the coil on a welding machine are disclosed. The coil 1 includes bundling wires 3a–3d. The beginning wire end of the coil is bent to extend in a radial direction of the coil loop, and is then bent in a direction to extend parallel to the center axis of the coil, thus defining an L-configuration 1sr+1sa. A wire feed adapter 5 includes a barrel 5b formed with notches 5br–5br4 and 5ar–5a4 for receiving beginning ends 1s.

7 Claims, 17 Drawing Sheets

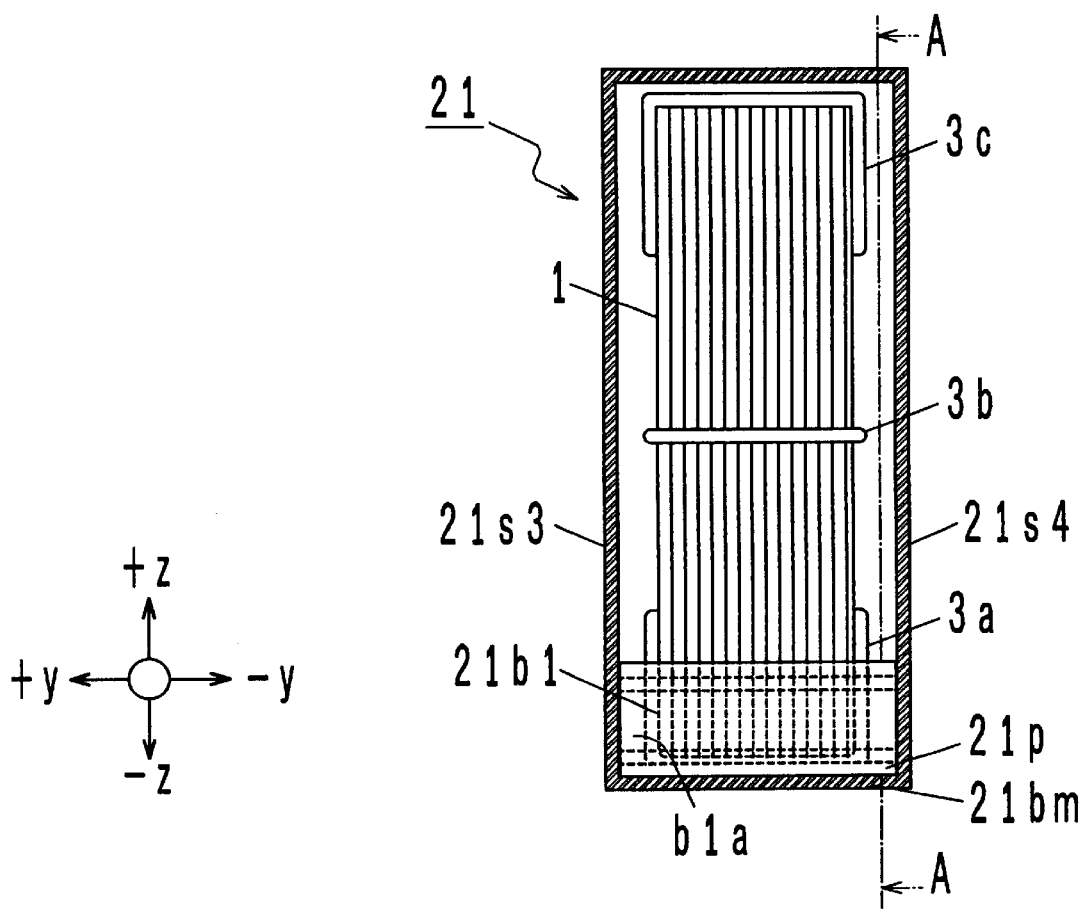

6,062,386

BUNDLED WELDING WIRE COIL AND METHOD OF BUNDLING

FIELD OF THE INVENTION

The invention relates to a bundled welding wire coil which is formed by winding a welding wire into a coil configuration, which is maintained by bundling it with bundling wires, and a method of bundling.

BACKGROUND OF THE INVENTION

A flux-cored or solid welding wire which is used in an arc welding operation and which may have a diameter in a range from 0.6 to 2.4 mm is prepared in the form of laminated coil winding. Thus the welding wire is coiled into a cylindrical or doughnut-shaped configuration, and one unit thereof weighs from 1 to 20 kg and has an inner coil diameter of 50 to 180 mm $\phi$ and a coil width of 40 to 100 mm.

Such a welding wire coil may be coiled around a winding form such as a reel, spool or the like (as disclosed, for example, in Japanese Laid-Open Patent Applications No. 10,346/1983 and No. 19,646/1987) or the winding form may be removed upon completion of the winding operation to leave the wire coil in a form bundled with bundling wires, wide steel bands, plastic bands or the like. Alternatively, Japanese Laid-Open Patent Application No. 84,573/1993 discloses a coil which is formed without the use of a winding form such as a reel and which is subsequently constrained by removable retainers. U-shaped needles or springy clip-shaped metal wire jigs are illustrated for use as such constraining retainers. Japanese Laid-Open Patent Application No. 278,714/1994 discloses a technique which wraps a coil with an enclosure of composite aluminum film, which is then degassed and sealed.

For use, it is necessary to pay out the wire from the coil in a manner to avoid an entanglement of the wire, which is likely to occur if the coil configuration is collapsed. Accordingly, it is required to protect the coil against deformation when it is being conveyed.

For a coil provided with a winding form, the latter is coupled to the shaft of a wire feeder of a welding machine, thus drawing the welding wire from the winding form to be fed to a welding head. On the other hand, for a coil without a winding form, the coil is mounted on a winding form such as a spool or on a feed adapter, which is then coupled to the shaft of the wire feeder (see, for example, Japanese Laid-Open Patent Applications No. 111,770/1993 and No. 200,553/1993).

FIG. 16a shows a feed adapter 12 used in a conventional arrangement. A user removes a wrapping material from a welding wire coil constructed in the manner mentioned above, and mounts it on the adapter 12, which is in turn mounted on a feeder 13 of a welding machine. Before a welding operation can be initiated, the welding wire must be drawn from the feeder 12 and passed through a feed roller pair 15, a conduit liner 16 and a welding torch 17 of the welding machine. The coil is consumed with the progress of the welding operation, and when the remaining wire on the feed adapter 12 is substantially the wire in the lowermost tier of the coil, it springs and breaks up in a manner illustrated in FIG. 16b. This may cause the welding wire to be tangled with the shaft associated with the feed adapter, and once tangled, the wire feed operation must be interrupted disadvantageously.

SUMMARY OF THE INVENTION

It is a first object of the invention to allow the tier construction of the coil winding to be maintained for a welding wire coil which is not provided with a winding form such as a reel, preferably while minimizing labor for removing bundling wires during the preparation for initiation of a welding operation and eliminating a projection of ends of bundling wires. A second object is to prevent the collapse of the coil configuration during shipment. A third object is to facilitate a mounting of the wire coil on a welding machine. A fourth object is to prevent a spring-up of the wire toward the last phase of paying out the wire from the coil where the coil carries a reduced amount of remaining wire.

(i) In order to accomplish the first object, in accordance with the invention, there is provided a bundled welding wire coil comprising a welding wire coil (1) in the form of a hollow cylindrical configuration of an increased thickness and having opposite end faces which are substantially in the form of flat rings and an outer peripheral surface located between the opposite end faces which is substantially cylindrical;

a plurality of bundling wires (3a–3d) each encircling the coil in a rectangular loop by passing through a center space in the coil and being bent at right angles so as to extend along the inner peripheral surface and the opposite end faces of the coil, thus forming a pair of bent limbs which are bent again at right angles to extend along the outer peripheral surface of the coil;

and a tie wire (2/1e) extending circumferentially along the outer peripheral surface of the coil and acting to clamp the both limbs of each bundling wire against the outer peripheral surface so that the limbs of each bundling wire which run substantially parallel to the outer peripheral surface are urged against the outer peripheral surface, the ends (3as–3ds, 3ae–3de) of the both limbs of each bundling wire being folded back upon themselves after looping around the tie wire.

It is to be understood that reference characters designating corresponding parts of embodiments shown in the drawings and to be described later are entered in parentheses in the preceding and following paragraphs for the ease of understanding.

Thus, with the arrangement of the invention, in a region where each bundling wire (3a–3d) is tied to the tie wire (2/1e), the ends of each bundling wire are folded upon themselves (or reversed through 180°), thus minimizing a projection of such ends. The bundled welding wire coil is contained in a holder, which may comprise a packaging box (21; FIGS. 9a–12a), for example, for purpose of shipment. When the welding wire coil (1) is put to use, a user initially mounts the coil (1) on a feed adapter (5; FIG. 15), which serves containing the coil (1) during a welding operation, uncouples the ends of the tie wire (2/1e) which are engaged with each other in a looping manner, and then draws either a first end (2s) or a second end (2e) by pulling it in the tangential direction of the coil. Thereupon, the wire (2/1e) is released from its regions of connection with the bundling wires (3a–3d) and can be removed from the coiled welding wire (1). When the tie wire (2/1e) is removed, the regions of the bundling wires (3a–3d) which were previously connected with the tie wire are no longer clamped, thus eliminating the need to release such regions of the bundling wires (3a–3d) individually. The release of the bundling of the coiled welding wire (1) is complete when the bundling wires (3a–3d) are removed.

(ii) The limb ends of each bundling wire (3a–3d) are linked together (FIGS. 7b and 8). Since the both limb ends (3ds, 3de; 3as, 3ae) of the bundling wire are engaged with each other, they cannot be separated from each other in a direction in which the tie wire (2/1e) extends or circumferentially of the coil.

(iii) The welding wire coil (1) has its beginning wire end (1s) which is located in the innermost tier and on the cylinder end face bent to extend radially inward of the coil loop and then bent to extend in a direction parallel to the center axis of the coil, thus forming a hook (1sr, 1sa) (FIGS. 1 and 5). When the coil (1) is mounted on a wire feed adapter (5), the beginning wire end (1s) is engaged with the wire feed adapter (5), whereby it rotates together with the adapter without producing any slip with respect the adapter and hence cannot cause a spring-up of the wire.

(iv) The tie wire defines a final winding loop (1e) of the welding wire coil, and the bundling wires (3a–3d) encircles the coiled welding wire except for the final winding loop.

(v) The final winding loop (1e) has an end which is engaged with the bundling wire (3a).

(vi) The both limb ends(3as, 3ae) of the bundling wire (3a), looping around the final winding loop (1e), are linked together by twisting them (3as, 3ae) about a perpendicular to the outer peripheral surface of the welding wire coil, whereby the final winding loop (1e) is engaged with the bundling wire (3a) while being bent in an S configuration.

(vii) In accordance with the invention, there is also provided a method of bundling a welding wire coil in the form of a hollow cylindrical configuration of a substantial thickness having opposite end faces which are substantially in the form of flat rings and an outer peripheral surface located between the opposite end faces which is substantially a cylindrical surface, comprising the steps of passing a plurality of bundling wires (3a–3d) through a center space of the coil and bending them at right angles so that they extend along the inner peripheral surface and the opposite end faces of the coil, thereby providing bent limbs;

bending the bent limbs at right angles so that they extend along the outer peripheral surface, the bundling wires thus encircling the coil except for a final winding loop (1e) thereof each in a rectangular loop;

providing a final winding loop (1e) of welding wire extending circumferentially along the outer peripheral surface to clamp the both limbs of the bundling wires against the outeripheral surface so that the both limbs which run substantially parallel to the outer peripheral surface are urged against the latter;

folding back the both limb ends of the bundling wires (3a–3d) upon themselves in a manner to loop around the final winding loop (1e);

and folding back the both limb ends of a selected one of the bundling wires (3a) upon themselves in a manner to loop around a terminal end of the final winding loop (1e) about a perpendicular to the outer peripheral surface of the welding coil (1) so that the both limb ends of the selected bundling wire are linked together and also linked with the terminal end to bend it into an S configuration.

Other objects and features of the invention will become apparent from the following description of several preferred embodiments thereof with reference to the drawings.

BRIEF DESCRIPTION OF THE DRAWINGS

FIG. 9b is a cross section of the packaging box 21 shown in FIG. 9a;

FIG. 10b is a cross section of the packaging box 21 shown in FIG. 10a;

FIG. 11b is a cross section of the packaging box 21 shown in FIG. 11a;

FIG. 12b is a cross section of the packaging box 21 shown in FIG. 12b;

DESCRIPTION OF THE PREFERRED EMBODIMENTS

Figure 1:
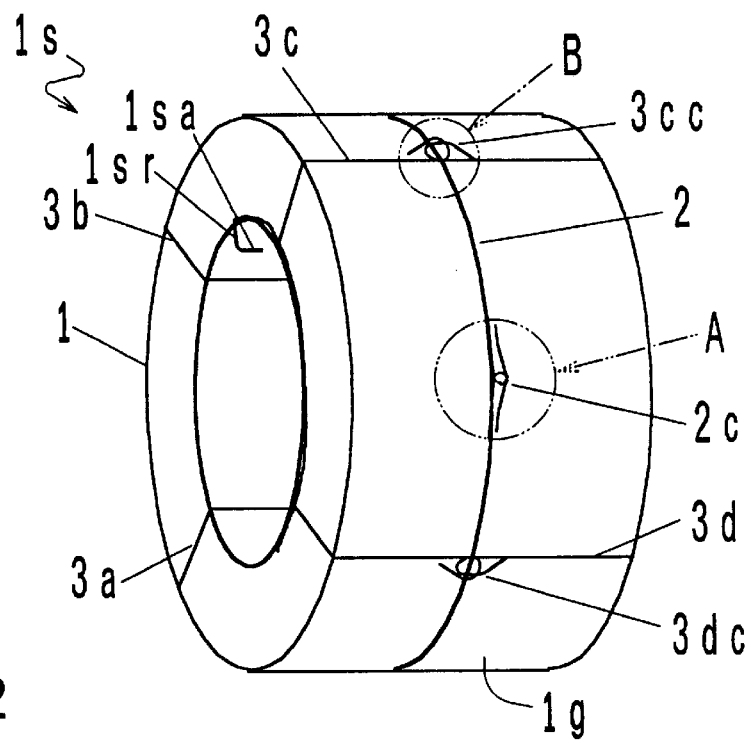
FIG. 1 is a perspective view of a first embodiment of the invention.

FIG. 1 shows a coil 1 according to a first embodiment. The coil 1 is cylindrical in configuration and has a rectangular cross section. The coil 1 has a weight on the order of 10 to 20 kg, and an outer diameter and an inner diameter which depend on the condition of use. A one complete turn of tie wire 2, which is separate from the coiled winding wire, is provided centrally crosswise of an outer peripheral surface 1g of the coil 1. At four locations which are spaced apart by approximately 90° around the circumference of the coil 1, the cylindrical coil is bundled by bundling wires 3a to 3d. After bundling, the beginning wire end 1s which is located in the innermost tier and at one of the cylinder end faces is initially bent to extend radially inward of the loop to provide a radial run 1sr, which is then bent over half its length located at the front end, in a direction substantially parallel to the axis of the coil and inward into the coil, to provide an axial run 1sa, thus providing the beginning wire end is in the form of a hook.

Figure 2:
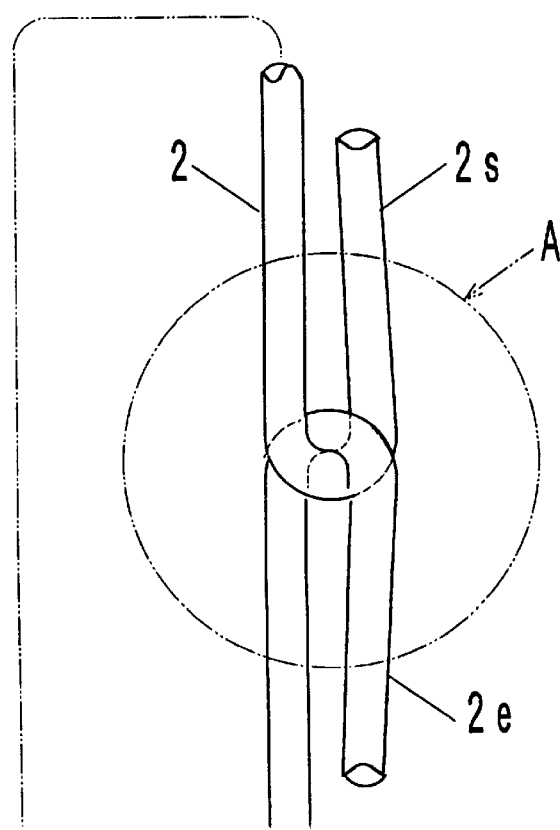
FIG. 2 is a front view, to an enlarged scale, of a knot between the beginning end 2s and the terminal end 2e of a tie wire shown in FIG. 1.

FIG. 2 shows, to an enlarged scale, a knot between the ends of the tie wire 2 shown in FIG. 1. A beginning end 2s and a terminal end 2e of the tie wire 2 are linked together so as to be tightened against an outer peripheral surface 1g of the coil (FIG. 1), the beginning end 2s and the terminal end 2e being folded back upon themselves so as to be directed in opposite directions. In this manner, the tie wire 2 is secured to the outer peripheral surface 1g centrally crosswise thereof. A solid wire (soft steel wire) of 1.4 mm φ is used for the tie wire 2. This material exhibits a high tensile strength and a reduced elongation though it is less susceptible to folding (or plastic deformation), and is thus suitable to be used as the tie wire 2. Table 1 below indicate the physical properties of the tie wire 2 and the bundling wires 3a–3d.

TABLE 1

| wire [1.4 φ] | TS (N/mm²) | EL (%) | hardness (Hv) |
| --- | --- | --- | --- |
| bundling wire | 325–330 | 30.3–32.2 | 100–104 |
| tie wire | 832–862 | 1.6–2.1 | 278–282 |

TS: tensile strength, which is determined in a tensile test by dividing a tensile load when a test piece is fractured by the cross-sectional area of the test piece.

EL: elongation percentage, which is determined by the following equation:

$$EL = [(L - L_0)/L_0] \times 100$$

where $L_0$ represents a distance between sampling points on a piece which is subject to a tensile test which prevails before the tensile test occurs and L a corresponding distance between the sampling points when the piece is fractured during the test.

Figure 3A:
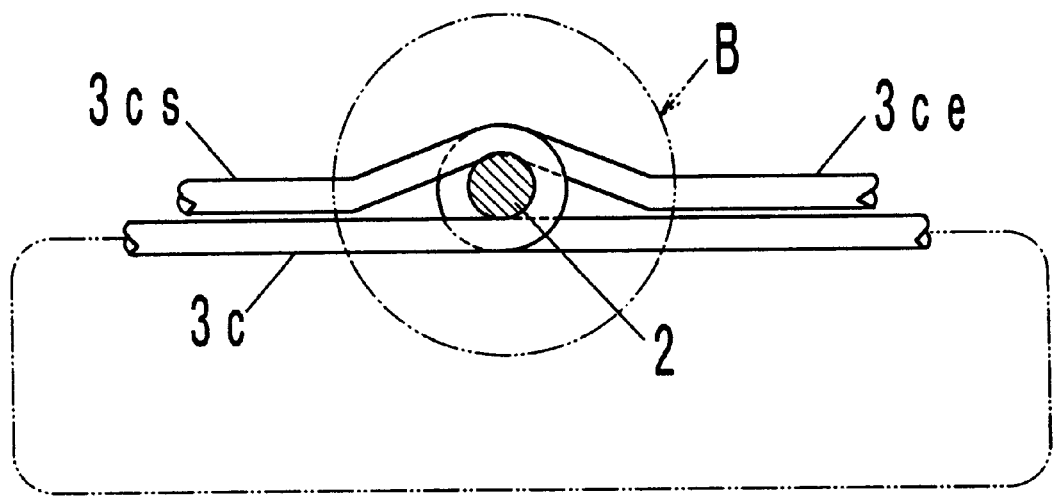
FIG. 3a is a cross section, to an enlarged scale, of a knot between a terminal end of a bundling wire 3c and the tie wire 2 shown in FIG. 1.
Figure 3B:
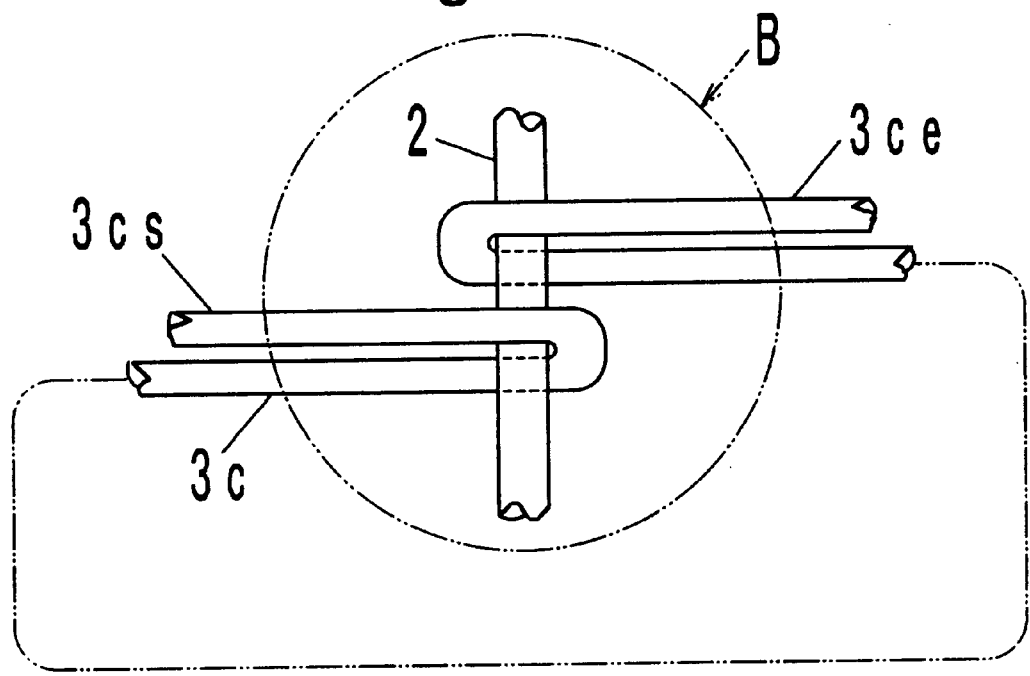
FIG. 3b is a side elevation, to an enlarged scale, of a knot or joint between the terminal end of the bundling wire 3c and the tie wire 2 shown in FIG. 1.
Figure 4A:
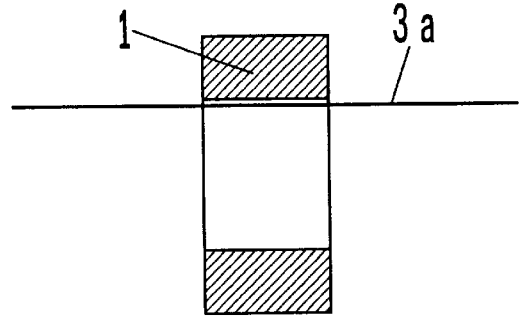
FIGS. 4a to 4g illustrate the process of tying the terminal end of the bundling wire 3a to the tie wire 2 shown in FIG. 1, FIGS. 4a to 4d being cross sections of a coil 1, FIGS. 4e and 4f being side elevations to an enlarged scale, and FIG. 4g being a cross sections of the joint to a further enlarged scale.
Figure 4B:
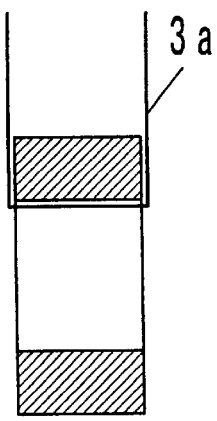
Figure 4C:
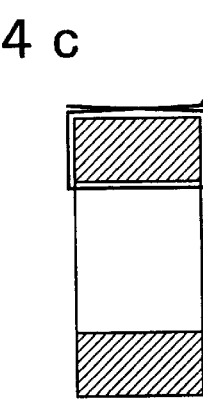
Figure 4D:
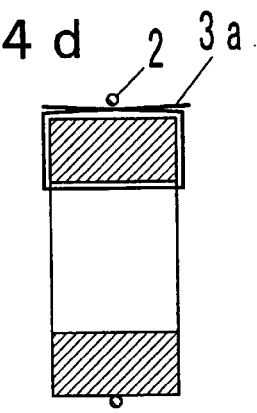
Figure 4E:
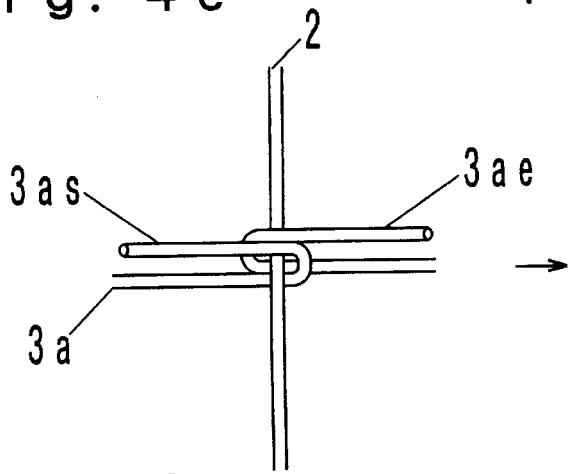
Figure 4F:
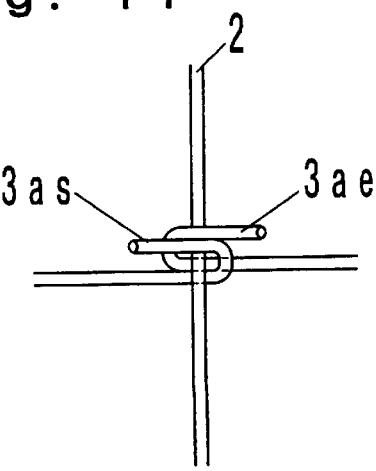
Figure 4G:
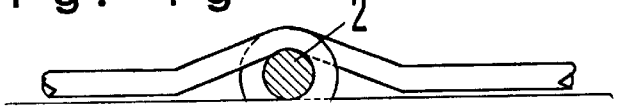

FIGS. 3a and 3b show a knot (an area of connection) between the ends of the bundling wire 3c to an enlarged scale. The bundling wire 3c forms one complete turn around the rectangular cross section of the coil 1, whereupon its beginning end 3cs and terminal end 3ce are connected to the tie wire 2. Thus, the tie wire 2 is placed over the beginning end 3cs and the terminal end 3ce of the bundling wire 3c, which are then folded back upon themselves, or pulled in opposite directions while a tension is being applied to both of them, thus forming a half-loop around the tie wire 2. It is to be noted that the beginning end 3cs and the terminal end 3ce are folded back so as to loop around the tie wire 2 without being linked with each other.

FIGS. 4a to 4g show the bundling process by the bundling wire. In the foregoing description, a knot formed between the ends of the bundling wire 3c has been described, but the drawings show the process of forming a knot between the ends of the bundling wire 3a. It is to be understood that the bundling wires 3a–3d are coupled to the tie wire 2 using by the same process.

A wire of 1.4 mm φ (a wire annealed from a piano wire) is used for each of the bundling wires 3a–3d. This material is easily susceptible to folding (or plastic deformation), but has a reduced tensile strength and an increased elongation. However, when bundling the coil 1 having a rectangular cross section, the use of such a material which is easily susceptible to folding (plastic deformation) is most adequate to be used as bundling wires 3a–3d for the coil in avoiding a rounding of corners of the coil cross section when the coil is bundled by these bundling wires (see Table 1). When such material is used and the beginning end 3cs and the terminal end 3ce of the bundling wire 3c are folded upon themselves to form a knot therebetween in the manner illustrated in FIGS. 3a and 3b, such knot is capable of withstanding a tensile force of at least 10 kgf. The ends of other bundling wires 3a, 3b and 3d are similarly coupled to the tie wire 2.

Figure 5:
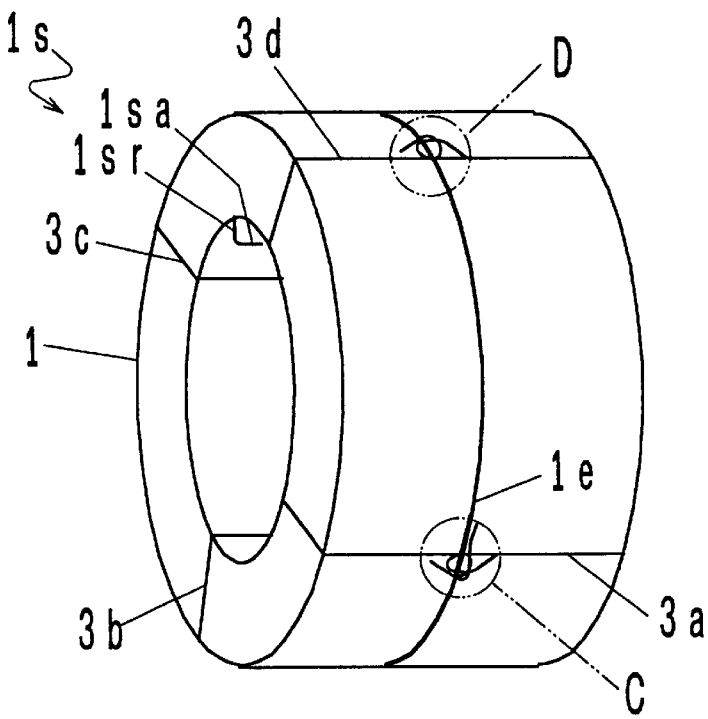
FIG. 5 is a perspective view of a second embodiment of the invention.

FIG. 5 shows a coil 1 according to a second embodiment. The coil 1 is formed into a wire winding which is similar to that shown in FIG. 1, but is different from the coil of the first embodiment in that a length of the coiled wire located toward the terminal end thereof which corresponds to nearly one turn, and which defines a final winding loop 1e of welding wire, is used as a tie wire. The portion of the coil 1 which is cylindrical is bundled by bundling wires 3a–3 1d at four locations which are spaced apart approximately 90°. The material used for the bundling wires remain the same as that used for the coil 1 shown in FIG. 1. After the bundling operation, a beginning wire end 1s which is located in the innermost tier and at one of the cylinder end faces is initially bent to extend radially of the loop to provide a radial run 1sr, and then nearly one-half of the radial run which is located at the front end thereof is bent in a direction to extend parallel to the axis of the coil and inward into the coil to provide an axial run 1sa, thus providing the beginning wire end 1s in a hook form.

Figure 6:
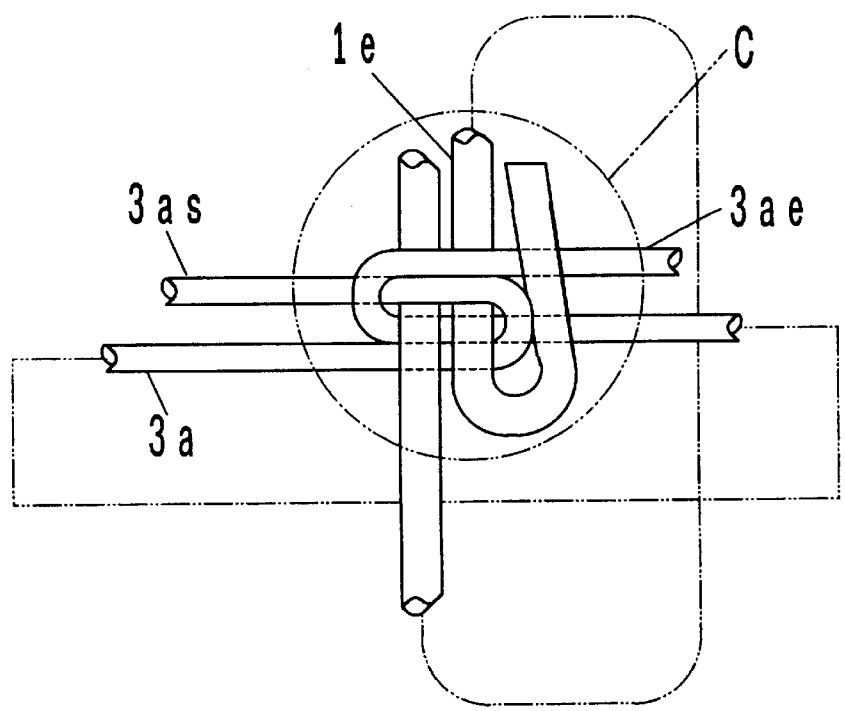
FIG. 6 is a side elevation, to an enlarged scale, of a knot between a bundling wire 3a and a terminal end of a final winding loop 1e of a welding wire, both shown in FIG. 5.

FIG. 6 shows, to an enlarged scale, a knot formed between the ends of the tie wire 1e shown in FIG. 5, which is the final winding loop of welding wire. Each end of the bundling wire 3a is folded back upon itself in a manner to loop around both the terminal end of the tie wire 1 and the wire in the immediately preceding loop, and then the terminal end of the tie wire 1 is folded back upon itself so as to loop around the bundling wire 3a. In this manner, the terminal end of the tie wire 1 is engaged with the bundling wire 3a which serves as a detent. It will be seen that the both ends of the bundling wire 3a are folded back upon themselves, defining U configuration while they are linked together.

Figure 7A:
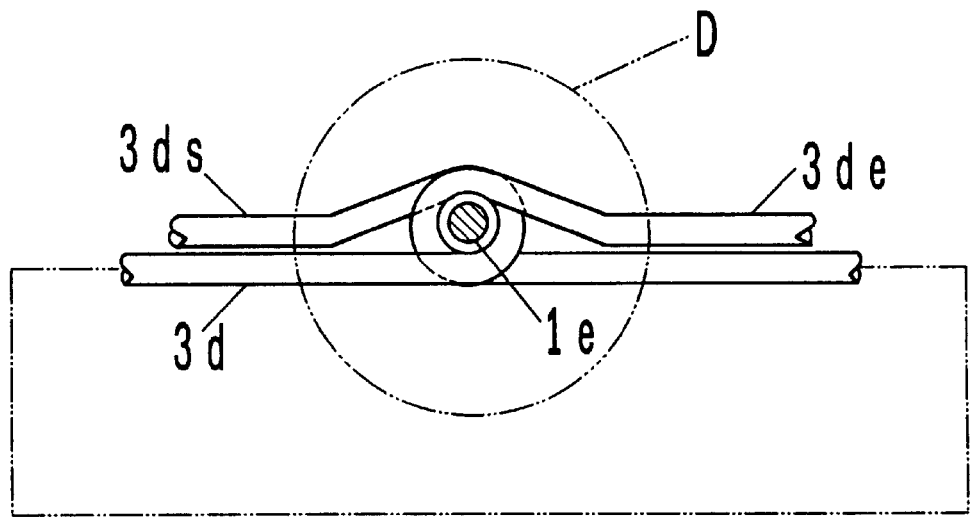
FIG. 7a is a cross section, to an enlarged scale, of a knot between the bundling wire 3d and the tie wire 2 both shown in FIG. 5.
Figure 7B:
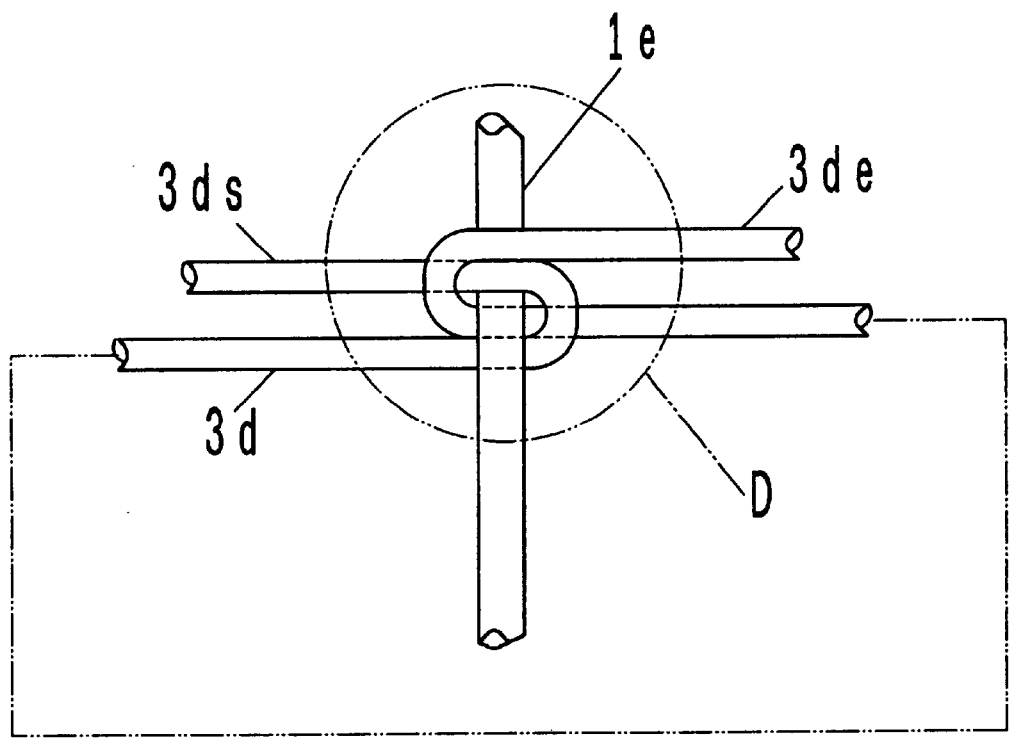
FIG. 7b is a side elevation, to an enlarged scale, of a knot between the bundling wire 3d and the tie wire 2 both shown in FIG. 5.

FIGS. 7a and 7b illustrate a knotting of the bundling wire with respect to the tie wire 1e. The bundling wire 3d has its opposite ends folded back upon themselves in a manner to loop around the tie wire 1e, thus coupling these ends to the tie wire 1e. The both ends of the bundling wire 3d are folded back upon themselves to define U-configuration and are linked together. Other bundling wires 3b, 3c are coupled to the tie wire 1 in the similar manner as the coupling of the bundling wire 3d.

Figure 8:
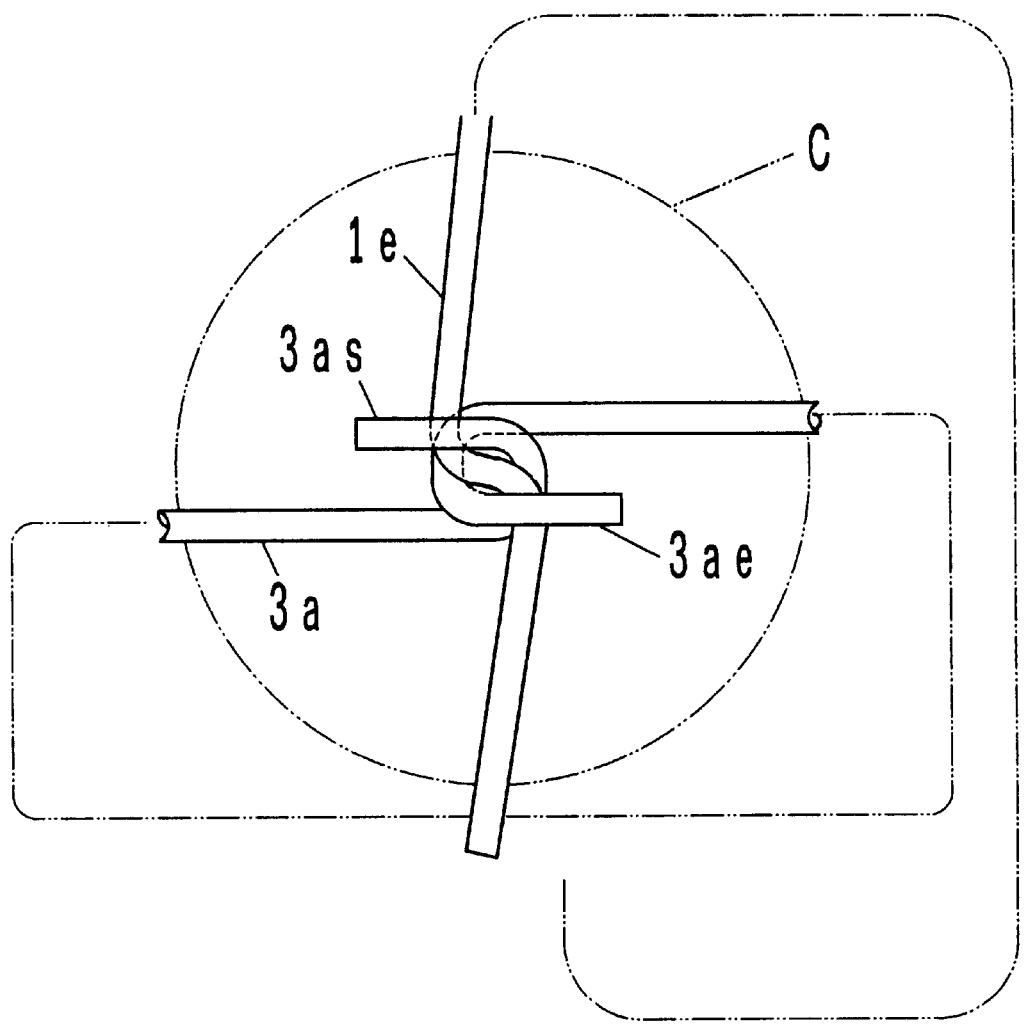
FIG. 8 is a side elevation, to an enlarged scale, of one modification of the knot between the bundling wire 3a and the terminal end of the final winding loop 1 of the welding wire, both shown in FIG. 5.

FIG. 8 shows a modification of a knot formed between the terminal end of the final winding loop 1e and its associated binding wire 3a when the final winding loop 1e of welding wire is used as a tie wire. In this modification, the both limb ends 3as, 3ae of the binding wire 3a are folded back upon themselves through an arc of 180° about a perpendicular to the outer peripheral surface of coil 1 so that the both limb ends are linked together while looping around the final winding loop 1e, whereby the final winding loop is bent into an S configuration. The S-configured bending provides a detent which constrains the final winding loop 1e to the bundling wire 3a, thus dispensing with the formation of an L-shaped folding, as is done in the arrangement of FIG. 6, in the terminal end of the final winding loop 1e. In the event a difficulty is experienced in bending the final winding loop into an S configuration during the binding operation of the bundling wire 3a, the terminal end of the final winding loop may be previously bent into an S configuration before binding the bundling wire 3a thereto.

Figure 9A:
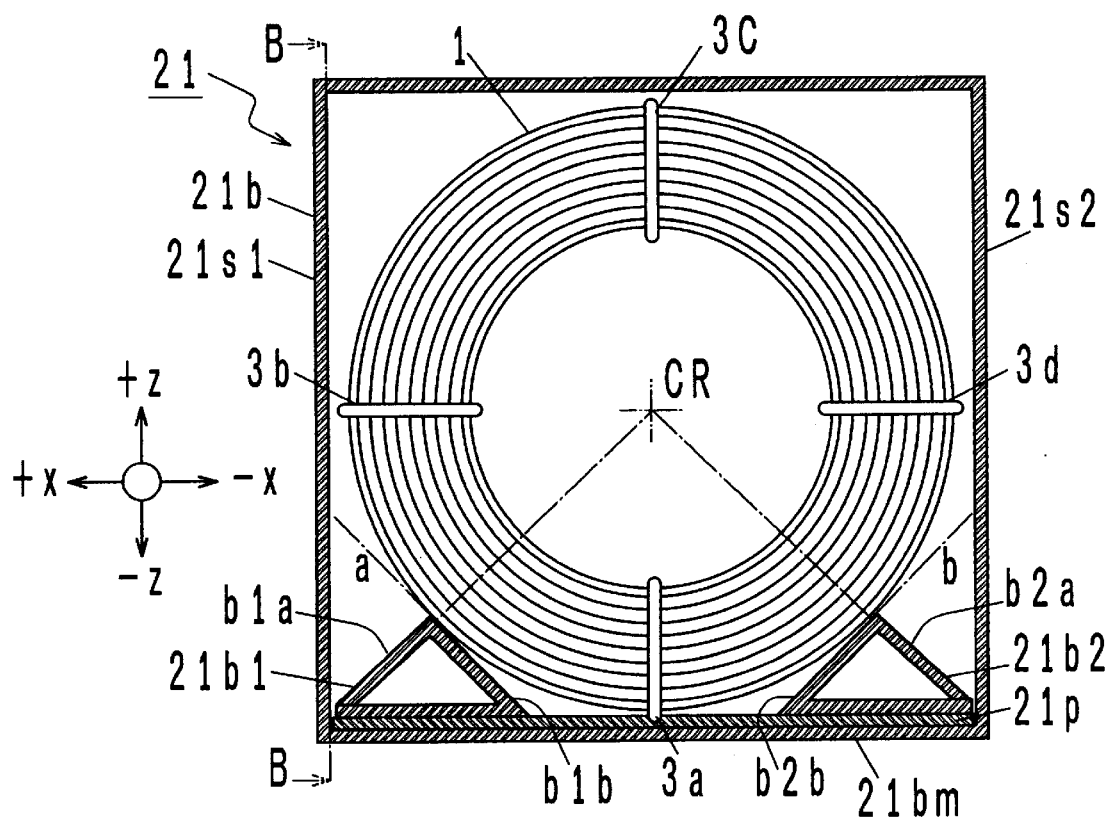
FIG. 9a is a longitudinal section of a first form of packaging box 21 which is suitable for packaging the welding wire coil according to the invention.
Figure 9B:
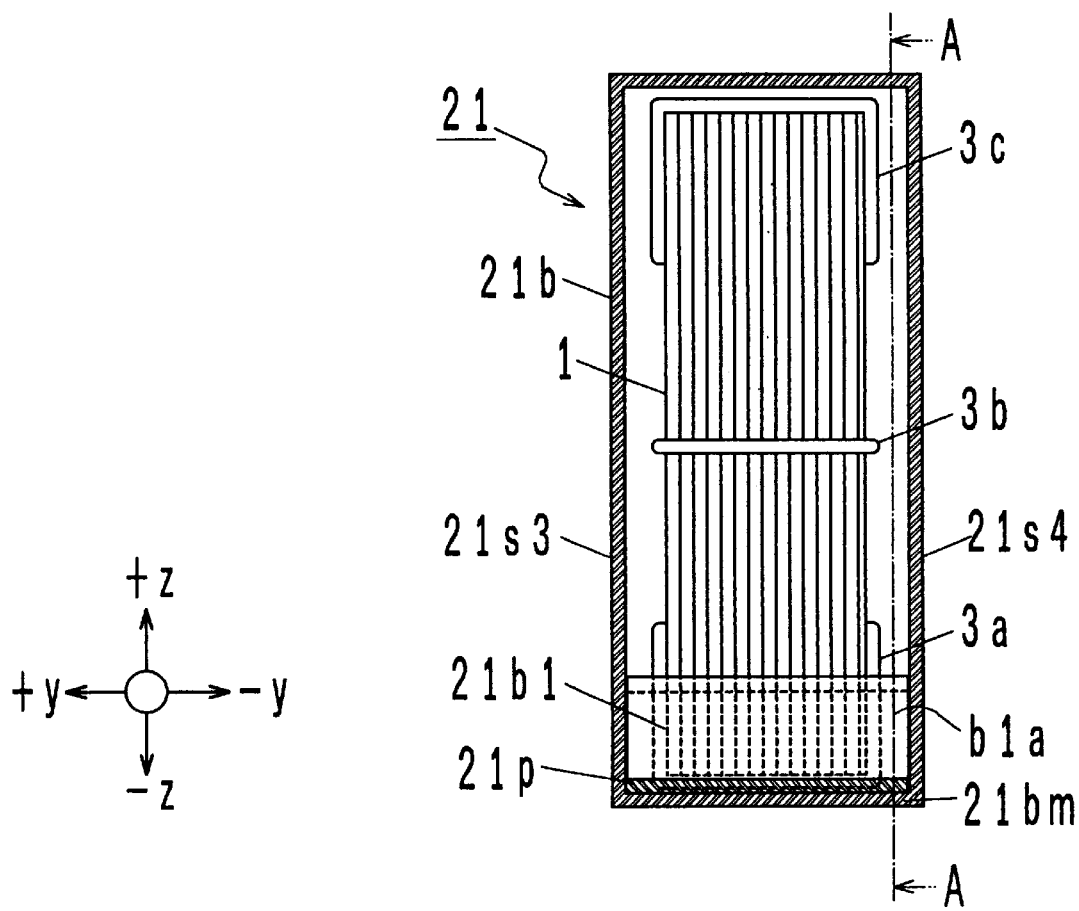

FIGS. 9a and 9b show a first form of packaging box which contains the coil 1 mentioned above in longitudinal section and in cross section, respectively. A coil 1 which is not provided with a winding form such as spool is contained in vertical position, with its coil axis extending in the horizontal direction y, within a packaging box 21 formed of a corrugated cardboard. If required, a plurality of packaging boxes 21 each containing a coil 1 may be stacked one above another in a container for shipment. An outer box 21b which forms the packaging box 21 has its upper surface formed as a closure which can be opened or closed about a hinge defined by one end thereof which adjoins with either vertical lateral surface 21s3 or 21s4. As mentioned previously, the coil 1 is bundled into a cylindrical or doughnuts-shaped configuration having a rectangular cross section by the bundling wires 3a–3d, and its outer periphery is in contact with the bottom surface of the outer box, whereby it is readily rollable in the x direction. In the event the coil 1 rolls in this manner, it impacts either vertical lateral surface 21s1 or 21s2 of the outer box 21b to damage it or may impact against other object with either one of the vertical lateral surfaces 21s1, 21s2 interposed therebetween, whereby it is highly likely to be deformed.

To accommodate for such likelihood, a pair of anti-roll blocks 21b1 and 21b2, formed of a corrugated cardboard, are disposed on the bottom surface 21bm of the outer box 21b on the opposite sides of the coil 1. Each of the anti-roll blocks 21b1 and 21b2 is triangular in section as viewed in the zx-plane, and has a length in the y direction which corresponds to the depth of the outer box 21b or the depth dimension of the bottom surface 21bm in the clear. These anti-roll blocks 21b1 and 21b2 are adhesively bonded to a bottom plate 21p, also formed of a corrugated cardboard. The bottom plate 1p is sized in conformity to the dimensions of the bottom plate 21bm of the outer box 21b in the clear. Accordingly, the blocks 21b1, 21b2 and the bottom plate 1p are fitted in the bottom of the outer box 21b, removing the likelihood that they are subjected to any movement.

A triangle formed by the block 21b has a side b1a, which is directed toward the center CR of the coil 1, and has another side b1b which is aligned with a tangential a to the outer periphery of the coil 1. Similarly, a triangle formed by the block 21b2 has a side b2a, which is directed toward the center CR of the coil 1, and another side b2b which is aligned with a tangential b to the outer periphery of the coil 1.

The dimensions of the blocks 21b1, 21b2 are chosen such that they contact the outer peripheral surface of the coil 1 at points which are situated at an elevation in the z direction which allows the lowermost point of the coil 1 to be just in contact with the bottom plate 21p, whereby the coil 1 is supported at three points to allow the weight load applied to the packaging box 21 to be distributed while preventing a rattling thereof. Alternatively, the blocks 21b1, 21b2 may contact the outer peripheral surface of the coil 1 at an elevation in the z direction where the lowermost point of the coil 1 is spaced from the bottom plate 21p. The coil 1 still retains the stability since it is supported in a floating manner at two points by the blocks 21b1 and 21b2. If the coil 1 tends to roll in the x direction by urging against the either block 21b1 or 21b2, the blocks 21b1, 21b2 exhibit a high compression strength which is enough to resist their deformation, thus effectively preventing a rolling motion of the coil 1.

Since the anti-roll blocks 21b1, 21b2 are formed with a corrugated cardboard, it can be inexpensively provided, with a low weight while facilitating its working. The entire packaging box 21 inclusive of the anti-roll blocks 21b1, 21b2 is formed of corrugated cardboards, and it can be disposed of without presenting any problem of an industrial waste.

Figure 10A:
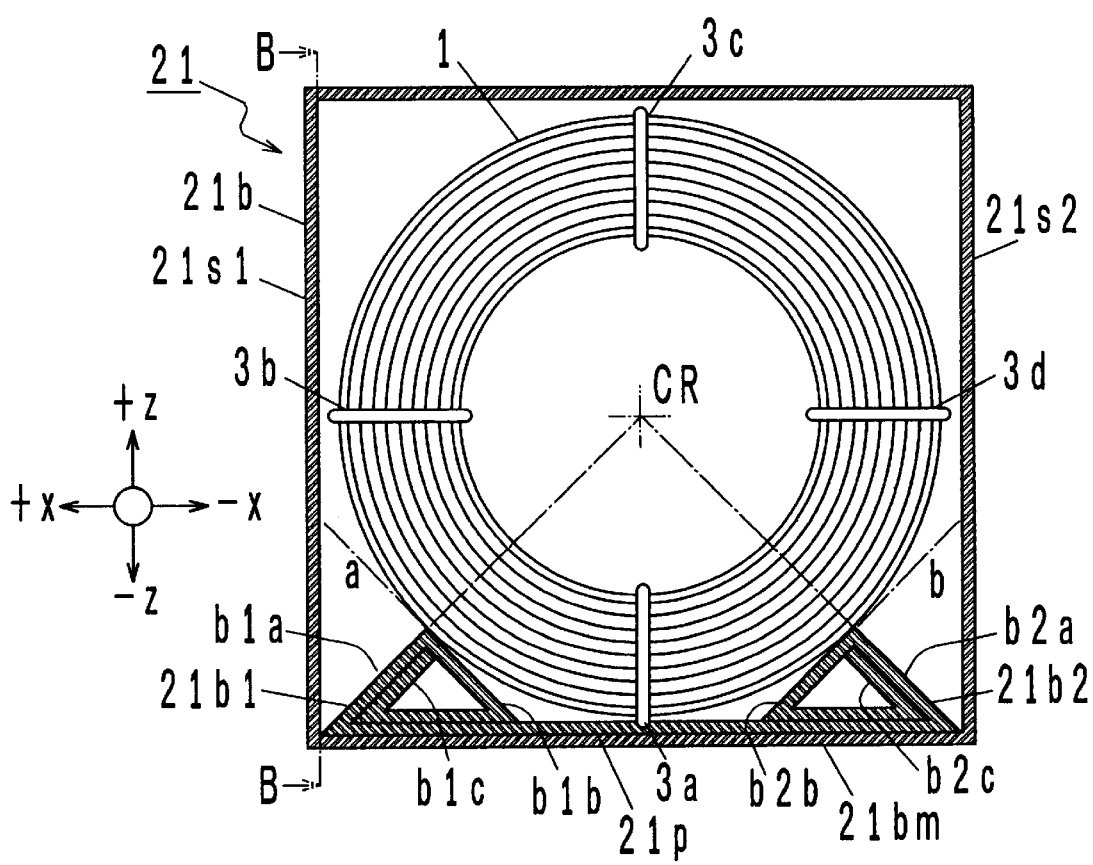
FIG. 10a is a longitudinal section of a second form of packaging box 21 which is suitable for packaging the welding wire coil according to the invention.

FIGS. 10a and 10b show a second form of packaging box in longitudinal section and in cross section, respectively. An outer box 21b remains similar to that shown in FIGS. 9a and 9b, but different anti-roll blocks 21b1, 21b2 are used herein. With the second form of packaging box, anti-roll blocks 21b1, 21b2 and bottom plate 21p are formed from a single elongate corrugated cardboard by a folding operation, and their depth or the length in the y direction conforms to the depth dimension of bottom surface 21bm of the outer box 21b in the clear. Thus, the anti-roll blocks 21b1, 21b2 are formed by folding the opposite ends of the elongate corrugated cardboard in a vortical manner to define a pair of triangles in cross section at the opposite ends. A side b1a of a triangle formed by the block 21b and a side b1c formed at the terminal end of the corrugated cardboard are both directed to the center CR of the coil 1 while a side b1b of the triangle formed by the block 21b1 is aligned with a tangential a to the outer periphery of the coil 1. Similarly, a side b2a of a triangle formed by the block 21b2 and a side b2c formed at the end of the corrugated cardboard are both directed toward the center CR of the coil 1 while a side b2b of the triangle formed by the block 21b2 is aligned with a tangential b to the outer periphery of the coil 1.

The size of the anti-roll blocks 21b1, 21b2 and a planar portion which provides a connection therebetween are chosen so as to conform to the dimensions of the bottom surface 21bm of the outer box 21b as measured in the clear. Accordingly, the blocks 21b1, 21b2 and a connection therebetween fit in the bottom of the outer box 21p, and cannot move freely.

The blocks 21b1, 21b2 are designed to contact the outer peripheral surface of the coil 1 at an elevation in the z direction which allows the lowermost point on the coil 1 to be just in contact with the bottom plate 21p, whereby the coil 1 is supported at three points to distribute the weight load upon the packaging box 21 while eliminating the likelihood of rattling. Alternatively, the blocks 21b1, 21b2 may be designed to contact the outer peripheral surface of the coil 1 at an elevation in the z direction where the lowermost point on the coil 1 is spaced from the bottom plate 21p. The coil 1 is still supported in the floating manner at two points by the blocks 21b1 and 21b2, thus presenting a high stability. The sides of the triangles formed by the anti-roll blocks 21b1, 21b2 except for the sides b1b, b2b have a double wall structure and hence exhibits a high compression strength, which avoids their deformation. The sides b1b, b2b of the triangles formed by the anti-roll blocks 21*b*1, 21*b*2 are directed so as to the aligned with the tangential to the outer peripheral of the coil 1, and hence the double wall structure provides an increased strength against the tendency of the coil 1 to roll in the x direction.

Figure 11A:
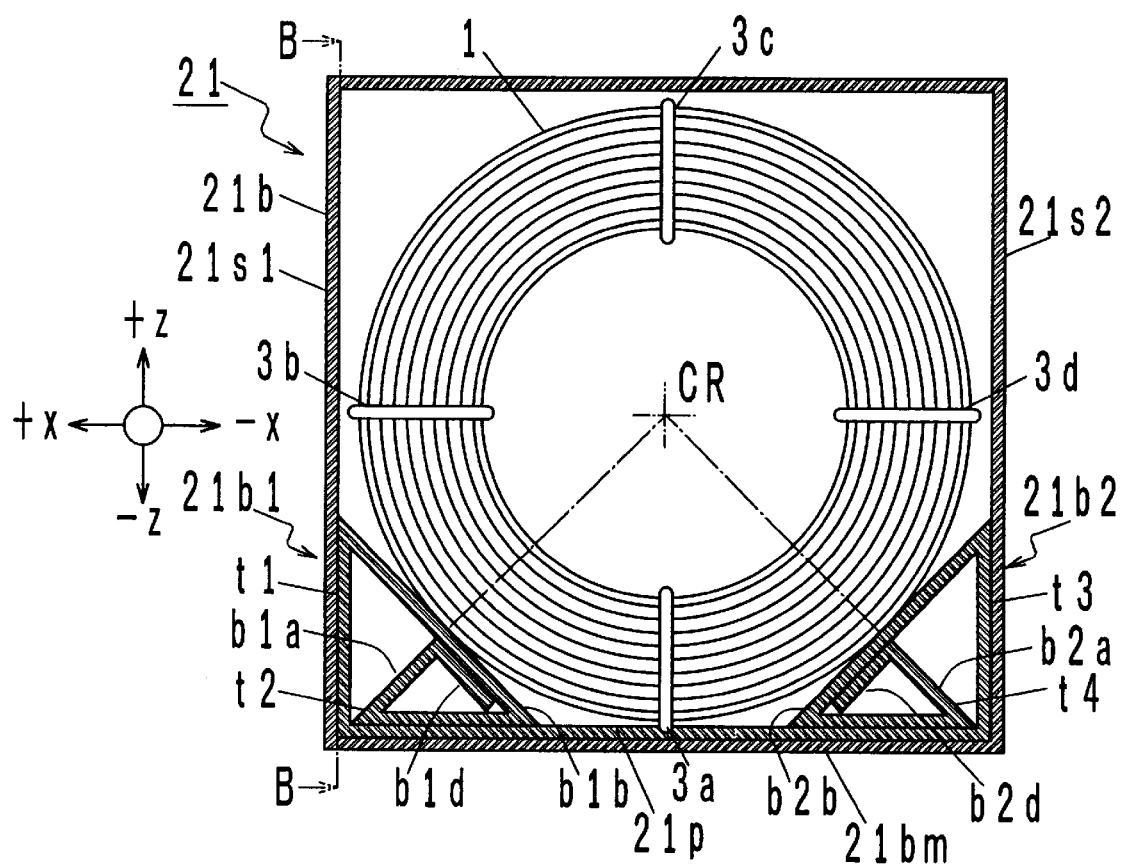
FIG. 11a is a longitudinal section of a third form of packaging box 21 which is suitable for packaging the welding wire coil according to the invention.
Figure 11B:
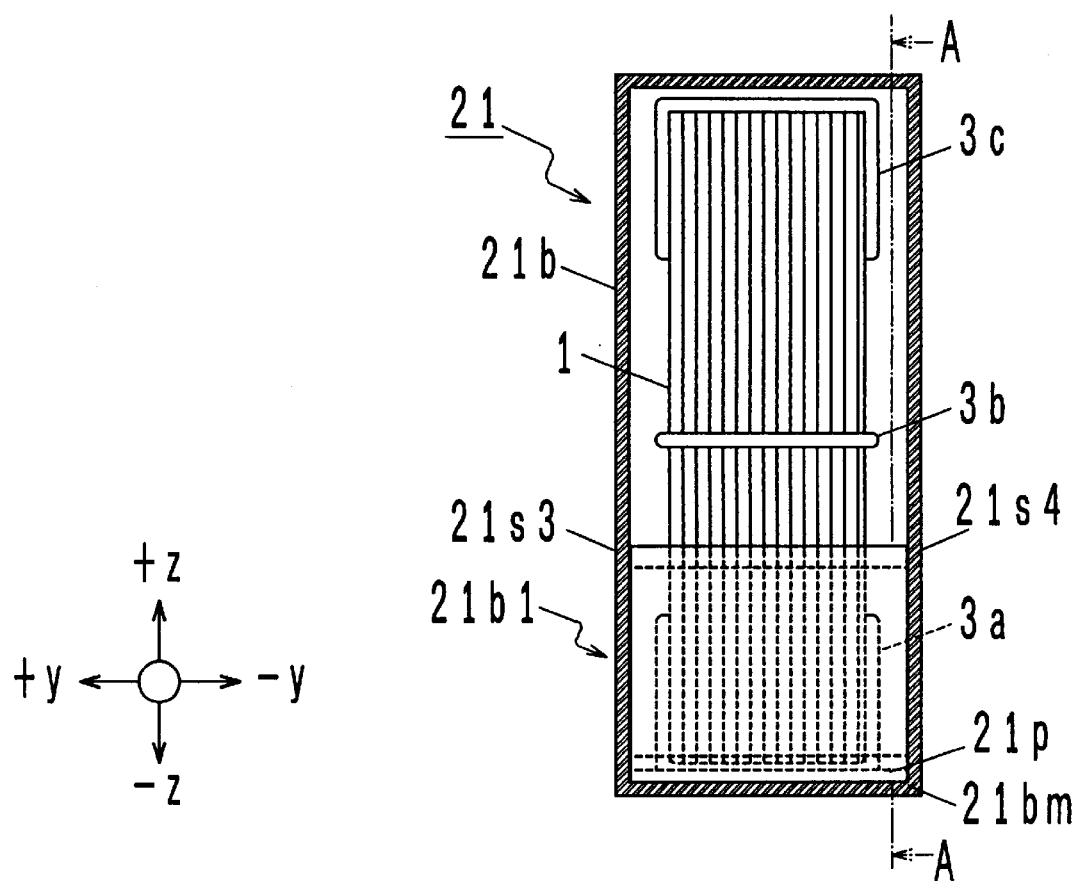

FIGS. 11*a* and 11*b* show a third form of packaging box in longitudinal section and in cross section, respectively. An outer box 21*b* is constructed in the similar manner as in the first and the second form of packaging box, but different anti-roll blocks 21*b*1, 21*b*2 are used herein. With the third form of packaging box, the anti-roll blocks 21*b*1, 21*b*2 and the bottom plate 21*p* are formed by folding a single elongate corrugated cardboard, and have a depth or a length in the y direction which conforms to the width of the outer box 21*b* or the dimensions of vertical lateral side surfaces 21*s*1, 21*s*2 measured in the clear. Specifically, the both ends of the elongate corrugated cardboard are folded in the vortical manner so as to define triangles at opposite ends which are partly double structured, as viewed in xz plane, thus forming the anti-roll blocks 21*b*1 and 21*b*2. Specifically, the block 21*b*1 includes an outer, larger triangle t1 and an inner, smaller triangle t2. The outer, larger triangle t1 includes a side which extends in the z direction while being disposed in contact with the inside of the vertical lateral surface 21*s*1 of the outer box 21*b*, another side which extends in the x direction while being disposed in contact with the inside of the bottom surface 21*bm*, and a third side b1*b* extending along a tangential to the outer periphery of the coil 1, thus defining a right-angled triangle. The inner, smaller triangle t2 has a side b1*a* which is directed toward the center CR of the coil 1, and another side b1*d* which is disposed in contact with the inside of the side b1*b*. The block 21*b*2 includes an outer, larger triangle t3 and an inner, smaller triangle t4. The outer, larger triangle t3 has a side which extends in the z direction while being disposed in contact with the inside of the vertical lateral surface 21*s*2 of the outer box 21*b*, another side which extends in the x direction while being disposed in contact with the bottom surface 21*bm*, and a third side b2*b* which extends along a tangential to the outer periphery of the coil 1, thus again defining a right-angled triangle. The inner, smaller triangle t4 has a side b2*a*, which is directed toward the center CR of the coil 1, and another side b2*d* which is disposed in contact with the inside of the side b2*b*.

As considered in plan view, the anti-roll blocks 21*b*1 and 21*b*2 are sized to conform to the dimensions of the bottom surface 21*bm* of the outer box 21*b* in the clear. Accordingly, the both blocks 21*b*1, 21*b*2 and a portion connecting them fit in the bottom of the outer box 21*b* and cannot move freely therein.

The blocks 21*b*1 and 21*b*2 may be designed to contact the outer peripheral surface of the coil 1 at an elevation in the z direction which allows the lowermost point on the coil 1 to be just in contact with the bottom plate 21*p*, whereby the coil 1 is supported at three points to distribute the weight load upon the packaging box 21 while removing a rattling thereof. Alternatively, the blocks 21*b*1 and 21*b*2 may be designed to contact the outer peripheral surface of the coil 1 at an elevation in the z direction where the lowermost on the coil 1 is spaced from the bottom plate 21*p*. The coil 1 is then still supported in the floating manner at two points by the blocks 21*b*1 and 21*b*2, thus presenting a high stability. The coil 1 may tend to roll in the x direction to urge against either block 21*b*1 or 21*b*2, but the blocks 21*b*1, 21*b*2 has a high compression strength which is enough to prevent their deformation, thus presenting an increased strength to guard against such rolling motion of the coil 1.

Figure 12A:
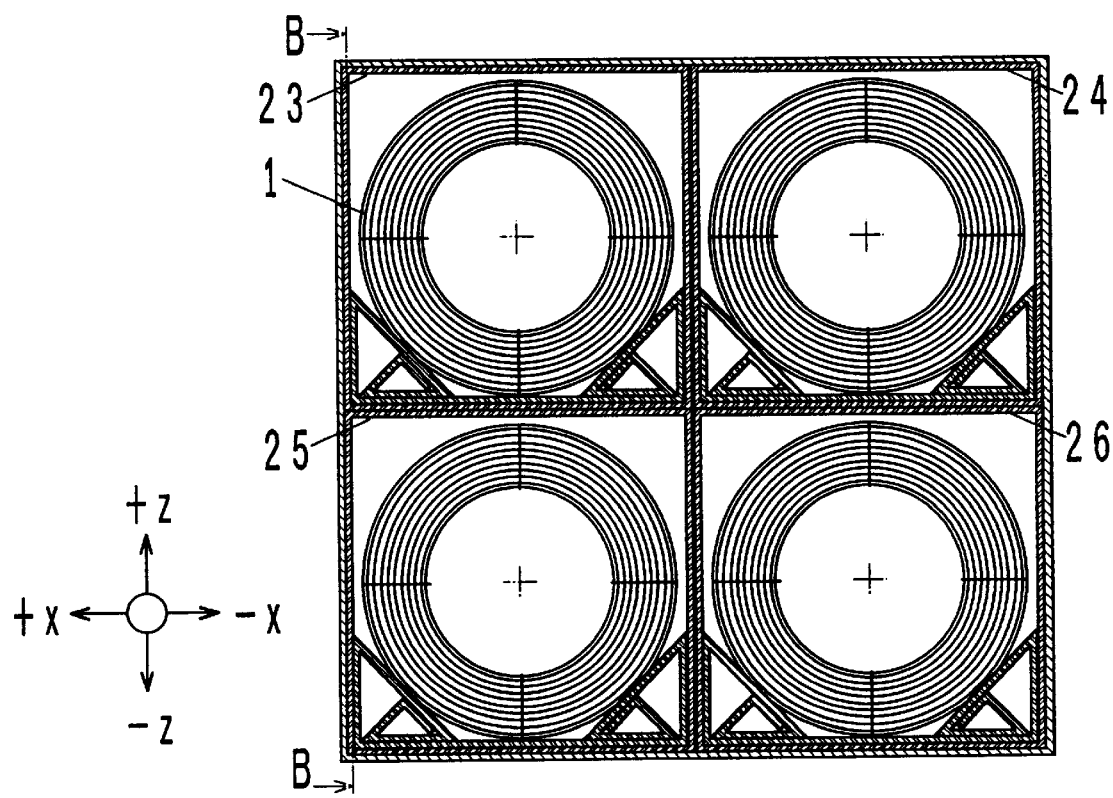
FIG. 12a is a longitudinal section of a fourth form of packaging box 21 which is suitable for packaging the welding wire coil according to the invention.

Packaging boxes mentioned above are each designed to contain a single coil 1. However, the lengths of the packaging box 21 and the blocks 21*b*1, 21*b*2 may be extended in the y direction so as to contain a plurality of coils which are aligned with each other to define a single cylinder of an increased length, thus collectively containing them. FIGS. 12*a* and 12*b* are a longitudinal section and a transverse section of an arrangement in which four packaging boxes 23 to 26, each collectively containing five coils 1 therein, are received in a single larger packaging box 27.

It will be understood that the coil 1 is removed by a user from either packaging box 21 or 23 to 26 to be mounted on a wire feed adapter 5 of a welding machine.

Figure 13:
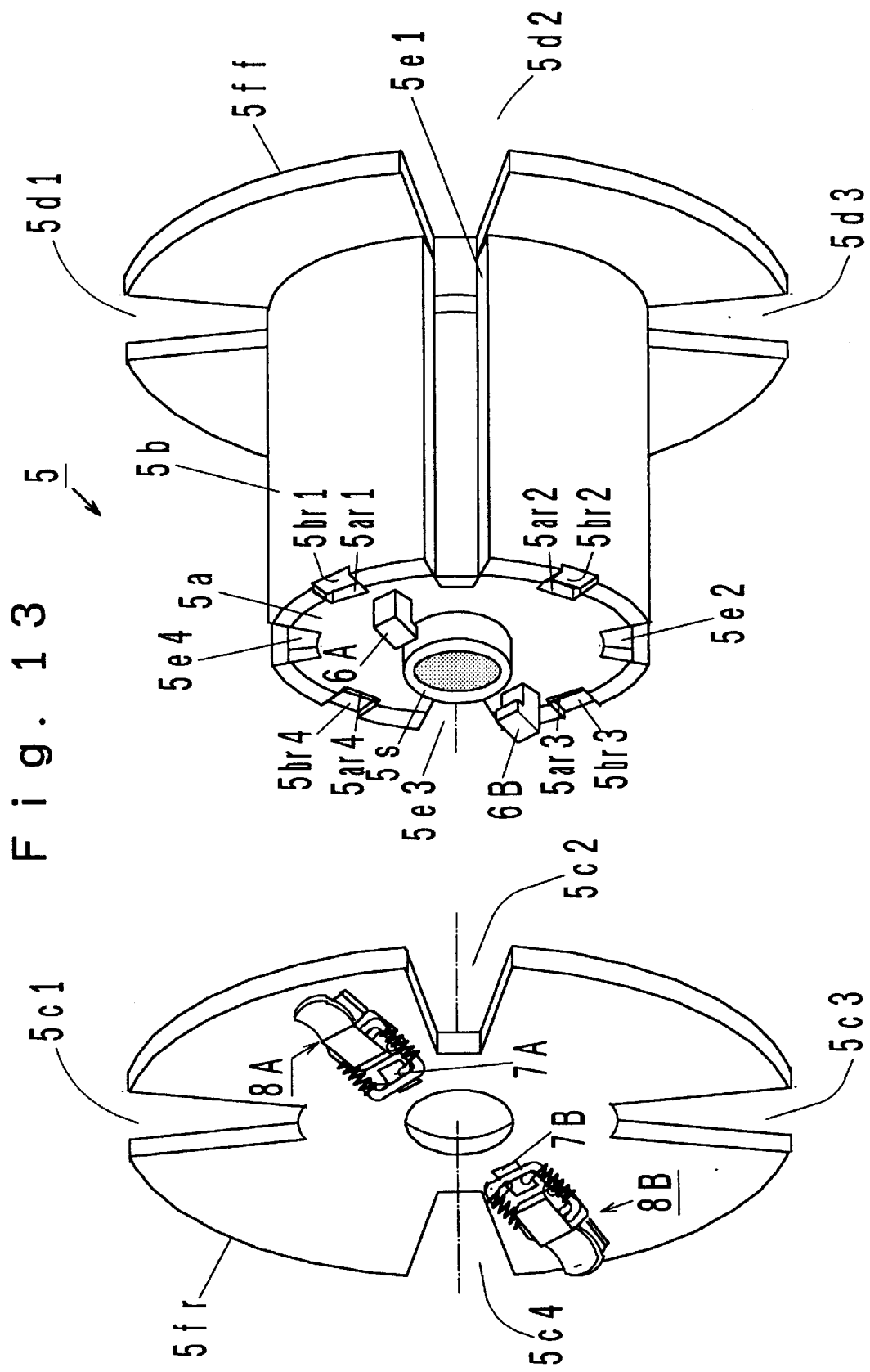
FIG. 13 is a perspective view of a wire feed adapter 5 which may be suitably used in mounting the welding wire coil of the invention on a welding machine before the coil is mounted.
Figure 14:
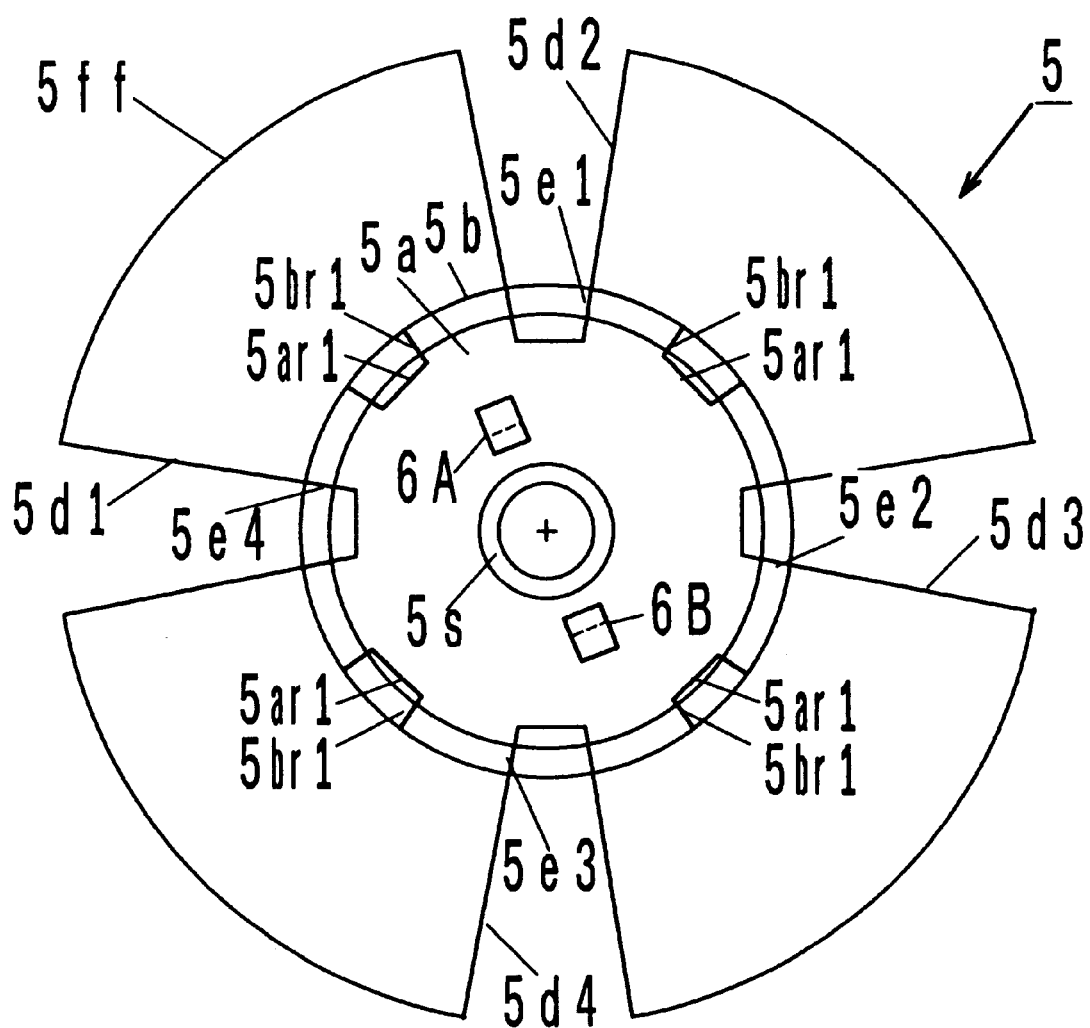
FIG. 14 is a front view of the wire feed adapter 5 shown in FIG. 13, as viewed from the end of the barrel 5b.
Figure 15:
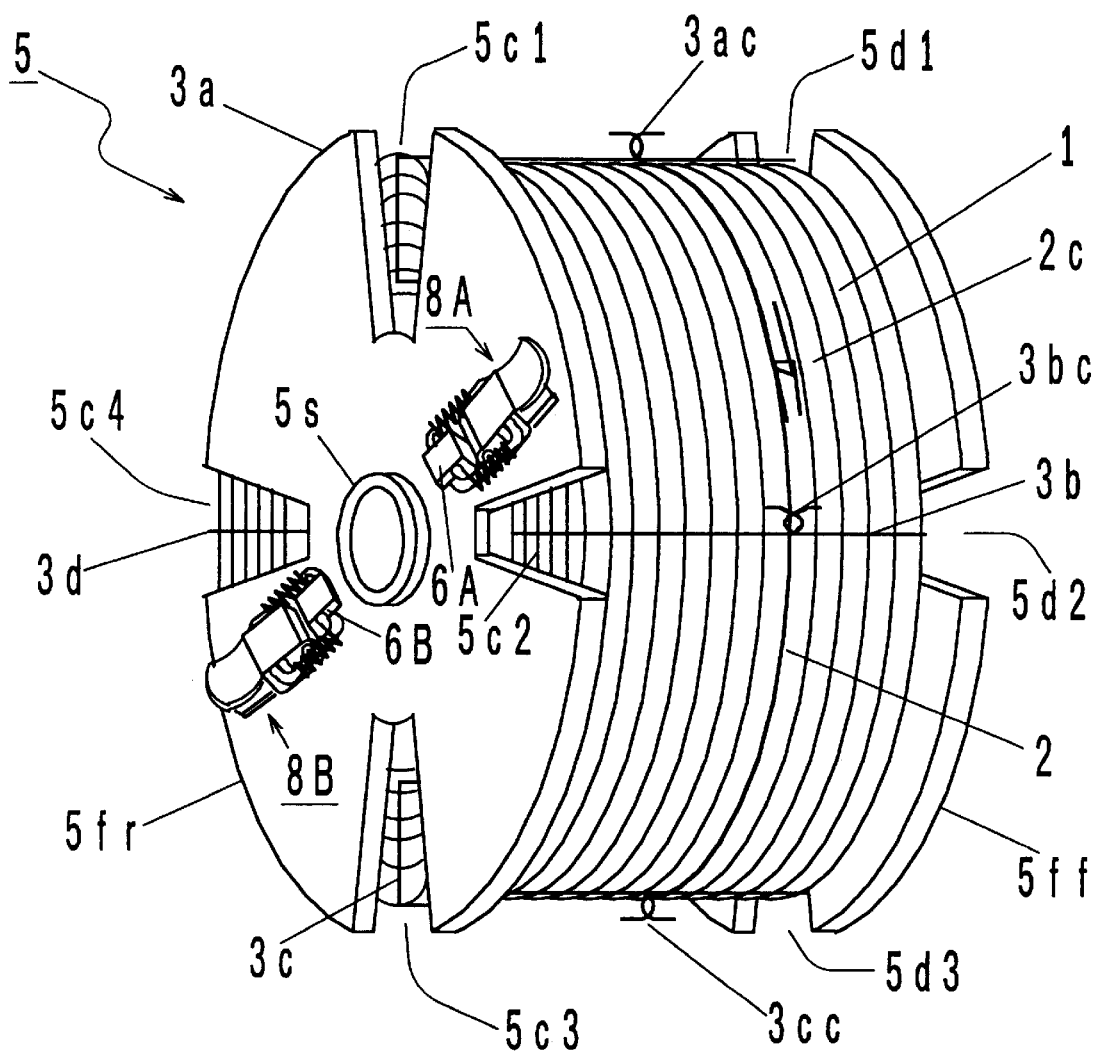
FIG. 15 is a perspective view showing the appearance of the wire feed adapter 5 on which a coil 1 is mounted.

Ao FIG. 13 shows components of a wire feed adapter 5, with a mounting/dismounting flange 5*fr* removed from a flanged barrel (5*b*+5*ff*). FIG. 14 shows a front view of the flanged barrel (5*b*+5*ff*), and FIG. 15 shows the appearance of the feed adapter 5. The coiled welding wire 1 is mounted on the barrel 5*b* provided with the flange 5*ff* (FIG. 13) and then the mounting/dismounting flange 5*fr* is attached to the other end of the barrel 5*b* with the coiled welding wire 1 interposed between the both flanges. The appearance of the feed adapter 5 under this condition is shown in FIG. 15.

The mounting/dismounting flange 5*fr* shown in FIGS. 13 and 15 is formed with notches 5*c*1, 5*c*2, 5*c*3 and 5*c*4, and the stationary flange 5*ff* is also formed with notches 5*d*, 5*d*2, 5*d*3 and 5*d*4 at corresponding positions. The stationary flange 5*ff* is integrally attached with the barrel 5*b*, which is formed with grooves 5*e*1, 5*e*2, 5*e*3 and 5*e*4 extending longitudinally in alignment with the notches 5*d*1 to 5*d*4, respectively. When the mounting/dismounting flange 5*fr* is attached, the grooves 5*e*1 to 5*e*4 are also aligned with the notches 5*c*1 to 5*c*4 in the flange 5*fr*. Thus, when the coil 1 is mounted on the feed adapter 5, the bundling wires 3*a* to 3*d* associated with the coil 1 can be received in the grooves 5*e*1 to 5*e*4 formed in the barrel 5*b* of the feed adapter.

At the opposite end from the flange 5*ff*, the barrel 5*b* has a pipe-shaped axle 5*s* which is disposed centrally therein and extending therethrough, and a pair of L-shaped hooks 6A, 6B, representing engaging members, are disposed on this end symmetrically with respect to the axle 5*s*. The mounting/dismounting flange 5*fr* is centrally formed with a circular opening which allows the axle 5*s* to pass therethrough, and is also formed with through-openings 7A, 7B (FIG. 13) for receiving the hooks 6A, 6B, respectively, which are disposed to be diametrically opposite to each other with respect to the circular opening. A pair of buckle locks 8A, 8B, which are effective to lock the hooks 6A, 6B as they pass through the openings 7A, 7B, are disposed so as to be diametrically opposite to each other with respect to the circular opening passing the axle 5*s* on the mounting/dismounting flange 5*fr*.

The buckle lock 8A has a knob which is pivotally mounted on the mounting/dismounting flange 5*fr* so as to be erectable from the plane of the flange 5*fr*. A pair of substantially U-shaped engaging pieces, each having a pair of limbs, the end of which are bent outwardly so as to engaged coiled compression springs, are combined together to define a rectangular form, and one of the engaging pieces is pivotally mounted on the knob. The limbs of the pair of the engaging pieces extend through the coiled compression springs, which urge them to be spaced apart while combining them to define a rectangle. When the knob is erected by a user so as to assume a position which is substantially perpendicular to the plane of the flange 5*fr*, the engaging pieces which define together a rectangular form and their coupled coiled compression springs move toward the circular opening which passes the axle 5*s*, whereby the internal space within the rectangle is located opposite to the opening 7A which receives a corresponding hook. Under this condition, the hook 6A which passes through the opening 7A can be received within the internal space of the rectangle defined by the engaging pieces.

The buckle lock 8B is constructed and sized in the same manner as the buckle lock 8A. When a knob of the buckle lock 8B is erected by a user to assume a position which is substantially perpendicular to the plane of the mounting/dismounting flange 5*fr*, the engaging pieces which define the rectangle and their coupled coiled compression springs of the buckle lock 8B also move toward the circular opening which passes the axle 5*s* and the internal space within the rectangle is located opposite to the opening 7B which receives a corresponding hook. Under this condition, the hook 6B which passes through the opening 7B can be received within the internal space of the rectangle defined by the engaging pieces.

As shown in FIGS. 13 and 14, the end of the barrel 5*b* is formed with notches (5*br*1, 5*ar*1) to (5*br*4, 5*ar*4) at a pitch of 90° for receiving the beginning end 1*s* of the coiled welding wire 1. The notches 5*br*1 to 5*br*4 are grooves formed in the end face of the barrel 5*b* for receiving the radial run 1*sr* (see FIGS. 1 and 5) of the beginning wire end 1*s* while the notches 5*ar*1 to 5*ar*4 are grooves formed in the peripheral surface of an end plate 5*a* which closes the corresponding end of the barrel 5*b* for receiving the axial run 1*sa* (see FIGS. 1, 5) of the beginning end is into the space within the barrel.

When mounting the coiled welding wire 1 on the wire feed adapter 5, the barrel 5*b* is inserted into the internal space of the wire coil 1 through the end face thereof which is not provided with the beginning wire end 1*s* until the stationary flange 5*ff* abuts against the end face of the wire coil. The wire coil 1 is then turned until the beginning wire end 1*s* is aligned with either one of the notches (5*br*1, 5*ar*1) to (5*br*4, 5*ar*4), whereupon the beginning wire end 1*s* is inserted into the aligned notch. The knobs of the buckle locks 8A, 8B are then erected substantially perpendicular to the plane of the mounting/dismounting flange 5*fr* and the mounting/dismounting flange 5*fr* is brought into abutment against the corresponding end of the barrel 5*b* so that the hooks 6A, 6B on the flanged barrel (5*b*+5*ff*) are received in the openings 7A, 7B formed in the mounting/dismounting flange 5*fr*, thus passing the heads of the hooks 6A, 6B into the rectangular space defined by the engaging pieces of the buckle locks 8A, 8B. The knobs of the buckle locks 8A, 8B are then thrown down as close as possible to the plane of the mounting/dismounting flange 5*fr*. In this manner, the coil 1 is mounted on and assembled with the wire feed adapter 5 as shown in FIG. 15.

Subsequently, the cylindrical axle 5*s*, located at the center of the wire feed adapter 5, is coupled to a feeder 13 (shown in FIG. 16*a*), thus allowing the coil welding wire 1 as bundled by the bundling wires 3*a*–3 1*d* to be mounted on the welding machine.

When the coil 1 is constructed according to the first embodiment (as shown in FIG. 1), the beginning end 2*s* and the terminal end 2*e* of the tie wire 2 shown in FIG. 2 are unlinked, as by twisting the terminal end to release it from the linkage and extending it rectilinearly, or by cutting the linked portion. When either the beginning end 2*s* or the terminal end 2*e* is pulled, the tie wire 2 can be removed by passing through the knots formed with the bundling wires 3*a*–3*d*. As a consequence, the bundling wires 3*a*–3*d* are disconnected from the tie wire 2. The ends of the bundling wires 3*a*–3*d* may be grasped as by a nipper and moved along the grooves 5*e*1 to 5*e*4 to be pulled off through the notches 5*d*1 to 5*d*4 or 5*c*1 to 5*c*4.

When the coil 1 is constructed in accordance with the second embodiment (as shown in FIGS. 5 and 6) or the modification (as shown in FIGS. 5 and 8), the folded-back terminal end (FIG. 6) or the S-shaped terminal end (FIG. 8) of the tie wire 1*e* or the final winding loop of the coiled welding wire may be grasped as by a nipper and pulled in a direction to move it away from the outer peripheral surface 1*g* of the coil 1. The pulling force allows the tie wire 2 or 1*e* to be disengaged sequentially from the bundling wires 3*a*–3*d* by expanding their U-shaped fold-back. The ends of the bundling wires 3*a*–3*d* which are disengaged from the tie wire may be grasped as by a nipper and moved along the grooves 5*e*1 to 5*e*4 to be pulled off the notches 5*d*1 to 5*d*4 or 5*c*1 to 5*c*4.

Figure 16A:
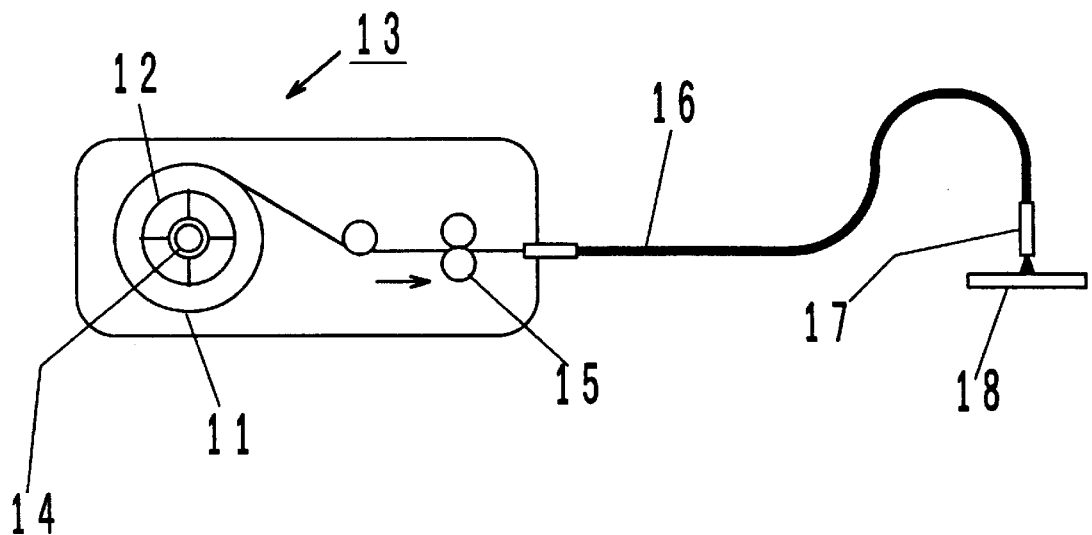
FIG. 16a is a side elevation of a feeder of a welding machine, illustrating a welding operation in which a conventional welding wire is drawn from a conventional wire feed adapter.
Figure 16B:
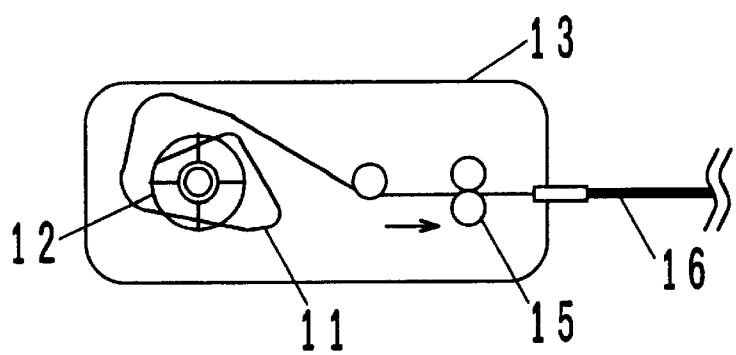
FIG. 16b is a side elevation illustrating a spring-up of the wire which may occur when the amount of remaining welding wire is reduced in arrangement using a conventional welding wire and a conventional wire feed adapter.

In either instance, the welding wire is drawn from the feed adapter 5 and passed through the feed roller pair 15, the conduit liner 16 and the welding torch 17 in preparation to initiating a welding operation. This condition is as shown in FIG. 16*a*. As the welding operation proceeds, the coiled welding wire is consumed. However, if the remaining wire on the feed adapter 5 approaches the lowermost tier in the coil, the wire in the lowermost tier is held tightly against the barrel 5*b* under the action of the wire pulling tension and cannot cause a spring-up of the wire, since the hook-shaped beginning wire end 1*s* is engaged with one of the notches (5*br*1, 5*ar*1) to (5*br*4, 5*ar*4) to constrain the beginning end 1*s* against movement in either peripheral or axial direction.

While preferred embodiments of the invention have been shown and described above, a number of changes and modifications are possible therein as described. Accordingly, it is not intended that the invention be limited to the specific construction or arrangement disclosed herein, but that the right is reserved to all changes and modifications coming within the scope of the invention defined by the appended claims.

What is claimed is:

1. A bundled welding wire coil comprising
   a welding wire coil of a hollow cylindrical configuration of a substantial thickness having opposite end faces which are substantially in the form of flat rings and an outer peripheral surface located between the opposite end faces which is substantially cylindrical;
   a plurality of bundling wires passing through a central space within the coil and being bent at right angles to extend along the inner peripheral surface and the opposite end faces of the coil to provide bent limbs, which are again bent at right angles to extend along the outer peripheral surface of the coil, thus encircling the coil in a rectangular loop;
   and a tie wire extending circumferentially along the outer peripheral surface to clamp the both limbs of the bundling wires against the outer peripheral surface so that the both limbs of the bundling wires which extend along the outer peripheral surface of the coil are urged against the latter, the both limb ends of each bundling wire being folded upon themselves while looping around the tie wire.

2. A bundled welding wire coil according to claim 1 in which the both limb ends of each bundling wire are linked together.

3. A bundled welding wire coil according to claim 1 in which the welding wire coil has a beginning wire end located in an innermost tier and at one of the cylinder end faces and which is bent in a radial direction of the coil and is then bent in a direction parallel to a center axis of the coil, thereby defining a hook.

4. A bundled welding wire coil according to claim 1 in which the tie wire comprises a final winding loop of the welding wire coil, the bundling wires encircling the coiled welding wire except for the final winding loop.

5. A bundled welding wire coil according to claim 4 in which the terminal end of the final winding loop is engaged with one of the bundling wires.

6. A bundled welding wire coil according to claim 5 in which the both limb ends of the bundling wire are twisted about a line perpendicular to the outer crosswise with respect surface of the welding wire coil and folded upon themselves so that the both limb ends of the bundling wire are linked together while looping around the final winding loop, whereby the final winding loop is bent into an S configuration to be engaged with the bundling wires.

7. A method of bundling a welding coil of a hollow cylindrical configuration of a substantial thickness having opposite end faces which are substantially in the form of flat rings and an outer peripheral surface located between the opposite end faces which is substantially cylindrical, comprising the steps of passing a plurality of bundling wires through a central space within the coil and bending them at right angles so as to extend across an inner peripheral surface and the opposite end faces of the coil except for a final winding loop, thereby leaving bent limbs thereof;

bending the bent limbs at right angles so as to extend along the outer peripheral surface, thus encircling the coil in a rectangular loop;

extending the final winding loop circumferentially along the outer peripheral surface so as to urge the both limbs which extend along to the outer peripheral surface against the latter, thus clamping the both limbs of the bundling wires against the outer peripheral surface;

folding back the both limb ends of the bundling wires upon themselves while looping around the welding wire of the final winding loop;

and twisting the both limb ends of the bundling wires crrosswise with respect to the outer peripheral surface of the welding coil so that the both limb ends of the bundling wire are linked together and are also linked with the terminal end of the final winding loop to bend it into an S configuration.

* * * * *